US012802540B2

(12) United States Patent
Excoffier et al.

(10) Patent No.: US 12,802,540 B2
(45) Date of Patent: Nov. 17, 2026

(54) METHOD FOR MONITORING AT LEAST ONE OBJECT ASSOCIATED WITH A RECEIVER DEVICE

(71) Applicant: ORANGE, Issy-les-Moulineaux (FR)

(72) Inventors: David Excoffier, Chatillon Cedex (FR); Dinh Thuy Phan Huy, Chatillon Cedex (FR)

(73) Assignee: ORANGE

( * ) Notice: Subject to any disclaimer, the term of this patent is extended or adjusted under 35 U.S.C. 154(b) by 0 days.

(21) Appl. No.: 18/257,916

(22) PCT Filed: Nov. 3, 2021

(86) PCT No.: PCT/FR2021/051930
§ 371 (c)(1),
(2) Date: Jun. 16, 2023

(87) PCT Pub. No.: WO2022/129715
PCT Pub. Date: Jun. 23, 2022

(65) Prior Publication Data
US 2024/0054872 A1 Feb. 15, 2024

(30) Foreign Application Priority Data
Dec. 16, 2020 (FR) ....................................... 2013346

(51) Int. Cl.
*G08B 13/24* (2006.01)
*G08B 13/14* (2006.01)

(52) U.S. Cl.
CPC ......... *G08B 13/2417* (2013.01); *G08B 13/14* (2013.01)

(58) Field of Classification Search
CPC ................ G08B 13/14; G08B 21/0275; G08B 13/2454; G08B 13/1409; G08B 13/1427; G06F 11/00
See application file for complete search history.

(56) References Cited

U.S. PATENT DOCUMENTS

| | | | | |
|---|---|---|---|---|
| 7,692,532 B2 * | 4/2010 | Fischer | G06K 17/0029 340/505 |
| 2012/0293307 A1 * | 11/2012 | Djuric | G06K 7/10465 340/10.2 |

(Continued)

FOREIGN PATENT DOCUMENTS

WO 2019023125 A1 1/2019

OTHER PUBLICATIONS

International Search Report dated Feb. 8, 2022 for corresponding International Application No. PCT/FR2021/051930, filed Nov. 4, 2021.

(Continued)

*Primary Examiner* — Mirza F Alam
(74) *Attorney, Agent, or Firm* — David D. Brush; Westman, Champlin & Koehler, P.A.

(57) ABSTRACT

A method for monitoring at least one object associated with a receiver device. The method is implemented by the receiver device and includes: verifying detection of a tag, which backscatters ambient signals, that is associated with the at least one object; and identifying the at least one object as being attached to the receiver device if the tag, which backscatters ambient signals, is detected, and as being away from the receiver device if the tag is not detected. Use in checking that a set of objects associated with a device remains close to the device, and in detecting a potential distancing from an object (theft or forgetting).

11 Claims, 5 Drawing Sheets

(56) References Cited

U.S. PATENT DOCUMENTS

| | | | | |
|---|---|---|---|---|
| 2015/0091729 | A1* | 4/2015 | Phillips | G08B 13/1409 340/568.2 |
| 2015/0287299 | A1* | 10/2015 | Eckert | G08B 13/1409 340/568.2 |
| 2017/0063490 | A1* | 3/2017 | Liu | G06F 11/00 |
| 2017/0154508 | A1* | 6/2017 | Grant | G08B 21/0272 |
| 2019/0317206 | A1* | 10/2019 | Sundaresan | G01S 13/765 |

OTHER PUBLICATIONS

Written Opinion of the International Searching Authority dated Feb. 8, 2022 for corresponding International Application No. PCT/FR2021/051930, filed Nov. 3, 2021.

English translation of the Written Opinion of the International Searching Authority dated Feb. 8, 2022 for corresponding International Application No. PCT/FR2021/051930, filed Nov. 3, 2021.

First Chinese Office Action dated Jan. 20, 2026 for corresponding Chinese Application No. 202180085478.7.

Vincent Liu et al., "Ambient Backscatter: Wireless Communication Out of Thin Air," SIGCOMM, ACM, 39-50, Aug. 27, 2013.

* cited by examiner

METHOD FOR MONITORING AT LEAST ONE OBJECT ASSOCIATED WITH A RECEIVER DEVICE

CROSS-REFERENCE TO RELATED APPLICATIONS

This application is a Section 371 National Stage Application of International Application No. PCT/FR2021/051930, filed Nov. 3, 2021, which is incorporated by reference in its entirety and published as WO 2022/129715 A1 on Jun. 23, 2022, not in English.

FIELD OF THE DISCLOSURE

The present invention relates to a method for monitoring objects, in particular a method for monitoring at least one object associated with a receiver device.

It relates also to a receiver device configured to implement this method.

The invention applies in particular to verifying that a set of objects associated with a device remain in proximity to the device. The invention can be used for many applications, for example to check that objects remain with their owner, thus being able to detect a forgotten or stolen object. Another example of use is the monitoring of a set of objects that have to remain within a room. According to another application, people, for example children, can be monitored, to detect any distancing.

BACKGROUND OF THE DISCLOSURE

Object monitoring is known practice, for example for tracing their movements and for checking that they are in the right location, for example in proximity to a user or attached to the user.

Different technologies can be used for tracing objects. One technology that is widely used is the RFID (Radio Frequency Identification) technology. One example of a known monitoring system consists in placing RFID tags on objects to be able to check that they are in proximity to a user. The user is provided with an RFID reader, this RFID reader being activated permanently to be able to read the RFID tags and check that all the monitored objects are located in proximity to the user. When an RFID tag that has to be attached to the user, or in other words in proximity to the user, is not read by the RFID reader, the user is alerted of this. This type of monitoring system is useful when a user takes the inventory of the objects which should be located in his or her proximity.

This type of system, although being effective, is costly for the user. Indeed, the RFID reader is costly equipment dedicated to this use.

Another monitoring system intended to monitor the attachment of a set of objects to a user uses mobile devices, such as smartphones, configured to communicate according to the Bluetooth Low Energy (BLE) communication standard. In this monitoring system, BLE emitters are placed on the objects that have to remain attached to the user or in proximity to the user. These emitters must be activated permanently for the smartphone of the user to be able to receive signals originating from the emitters. The smartphone takes an inventory of the objects in proximity periodically and, when it detects that it has moved away, or become detached, from the user, it alerts the user of this.

The BLE emitters are relatively costly equipment because they are configured to emit actively. Furthermore, a BLE emitter that is permanently emitting continuously consumes energy. Thus, a system using this type of technology is costly.

Thus, the monitoring of objects relying on technologies of RFID or BLE type results in high energy consumptions and implementation cost is high.

SUMMARY

The invention aims to improve the situation and proposes an object monitoring method that is effective while reducing energy consumption.

To this end, the invention targets, according to a first aspect, a method for monitoring at least one object associated with a receiver device.

According to the invention, the method is implemented by said receiver device and comprises:

- verifying a detection of a tag backscattering ambient signals that is associated with said at least one object, and
- identifying the object as being attached to the receiver device, if said tag backscattering ambient signals is detected, and as being detached from the receiver, if said tag backscattering ambient signals is not detected.

Thus, a verification is made as to whether the tag backscattering ambient signals that is associated with the object is detected by the receiver device. If the tag is detected, the object is situated in proximity and is considered to be attached to the receiver device. If the tag is not detected by the receiver device, the object is not located in proximity, or in other words, it is detached from the receiver device.

When the object is identified as being detached, or in other words, in the absence of detection of the tag backscattering ambient signals (or backscattering tag), an alert message can be generated, in order, for example, to alert the user of the receiver device to the absence of the object in proximity.

Thus, by virtue of the features of the method, a check is made as to whether it is attached to or detached from the receiver device.

The use of backscattering tags makes it possible to check if the object is in proximity to the receiver device, or in the same geographic zone as the receiver device, without additional energy consumption and without having to use a receiver device dedicated to the monitoring of the object.

According to a feature, an alert message is generated if said at least one object is identified as being detached from the receiver device.

Thus, a user is alerted when the object associated with the receiver device is identified as being detached. The user is thus alerted to the distancing of the object with respect to the receiver device, or in other words, he or she is alerted to the absence of the object in proximity to the receiver device.

According to another feature, an alert message is generated if said at least one object is identified as being detached from the receiver device for a predefined time period.

In this embodiment, the alert message is generated when the object is detached or distanced from the receiver device for a time period. In other words, if the object is identified as being detached for a time period less than the predefined time period, the alert message is not generated. By virtue of this feature, the unnecessary generation of alert messages is avoided. For example, a user of the receiver device moving momentarily away from an object associated with his or her receiver device would not receive an alert message.

According to a feature, the verification of the detection comprises the verification of a reception of a backscattered signal originating from said at least one object, the backscattered signal corresponding to an ambient signal and comprising a message comprising an identification datum relating to said at least one object.

When the object is situated in proximity to the receiver device (or within the same geographic zone as the receiver device), the receiver device receives a backscattered signal originating from the object, in particular originating from the backscattering tag. When the object moves away from the receiver device, the latter does not receive backscattered signals originating from the object. In other words, when the receiver device receives a signal backscattered by a backscattering tag, the object comprising this tag is attached to the reception device. On the other hand, when the receiver device does not receive any signal backscattered by a backscattering tag, the object comprising this tag is detached from the receiver device. The receiver device can thus detect the detachment of an object, through the absence of reception of a signal backscattered by the backscattering tag borne by this object.

According to a feature, if, upon the verification of the reception of a signal, a backscattered signal is received, the verification of the detection further comprises:

- the obtaining of the message comprising the identification datum relating to said at least one object; and
- the determination of the demodulation bit error ratio of said message obtained.

According to one embodiment, the verification of the detection further comprises the determination of the detection or of the non-detection of the backscattering tag as a function of the value of the determined bit error ratio, the backscattering tag being determined as being detected if the quantity of the bit error ratio is greater than or equal to a predefined bit error ratio, and as being not detected if the quantity of the bit error ratio is lower than the predefined bit error ratio.

Thus, the object is identified as being attached to or detached from the receiver device, is a function of the quantity of the bit error ratio, the object being identified as being attached if the quantity of the bit error ratio is greater than or equal to a predefined bit error ratio, and the object being identified as being detached if the quantity of the bit error ratio is lower than the predefined bit error ratio.

According to another embodiment, the verification of the detection further comprises the determination of the detection or of the non-detection of the backscattering tag as a function of the value of the determined bit error ratio, the backscattering tag being determined as being detected if the quantity of the bit error ratio is greater than or equal to a predefined bit error ratio for a first predefined detection time period, and as being not detected if the quantity of the bit error ratio is lower than the predefined bit error ratio for a second predefined detection time period.

Thus, the object is identified as being attached to the receiver device if the quantity of the bit error ratio is greater than or equal to a predefined bit error ratio for a first predefined time period, and the object is identified as being detached from the receiver device if the quantity of the bit error ratio is lower than the predefined bit error ratio for a second predefined time period.

In this embodiment, for an object to be identified as attached, the bit error ratio obtained must remain at a value greater than or equal to the predefined bit error ratio for a time period. Similarly, for an object to be identified as detached, the bit error ratio must remain at a value lower than the predefined bit error ratio for a time period. This avoids any successive changes of identification of the object as being attached to or detached from the receiver device. For example, in embodiments in which the receiver device emits an alert message when an object is identified as being attached or detached, unnecessary messages are avoided. In an embodiment in which the receiver device emits an alert message when an object is identified as being detached, a user of the receiver device who becomes momentarily separated from an object associated with his or her receiver device would not receive an alert message.

According to embodiments, the first predefined detection time period and the second predefined detection time period can be identical or different.

The features of the monitoring method presented below can be taken alone or in combination with one another.

The present invention relates, according to a second aspect, to a receiver device having at least one object associated, the receiver device comprising:

- a verification module configured to verify the detection of a tag backscattering ambient signals that is associated with said at least one object, and
- an identification module for identifying said at least one object as being attached to the receiver device if the tag backscattering ambient signals is detected, and as being detached from the receiver device if the tag backscattering ambient signals is not detected.

The present invention relates, according to a third aspect, to a system for monitoring at least one object comprising a tag backscattering ambient signals, the monitoring system comprising an emitter device configured to emit ambient signals and a receiver device in accordance with the invention and implementing the monitoring method in accordance with the invention.

The present invention relates, according to a fourth aspect, to a computer program capable of being implemented on a receiver device, the program comprising code instructions for the implementation of the steps of the monitoring method in accordance with the invention, when it is run by a processor.

The present invention relates, according to a fifth aspect, to an information medium that can be read by a processor in a receiver device, on which is stored a computer program comprising code instructions for the implementation of the steps of the monitoring method in accordance with the invention, when it is run by the processor.

The receiver device, the monitoring system, the computer program and the information medium offer features and advantages similar to those described previously in relation to the monitoring method.

BRIEF DESCRIPTION OF THE DRAWINGS

Other particular features and advantages of the invention will become more apparent from the following description.

In the attached drawings, given as nonlimiting examples.

DETAILED DESCRIPTION OF ILLUSTRATIVE EMBODIMENTS

The invention applies to object monitoring systems, in particular for verifying that a set of objects associated with a device remains in proximity to the device, and for detecting any distancing of an object. Such an object monitoring system can be used in many applications, for example to avoid the loss of an object (because of theft or having been forgotten for example). The term "object" is generic and can encompass an object per se, but also a living entity, such as a plant, an animal or a human being.

As will be described in detail hereinbelow, the monitoring system in accordance with the invention uses the ambient backscattering or backscattering of ambient signals emitted by a radiofrequency signal emitter device.

Figure 1A:
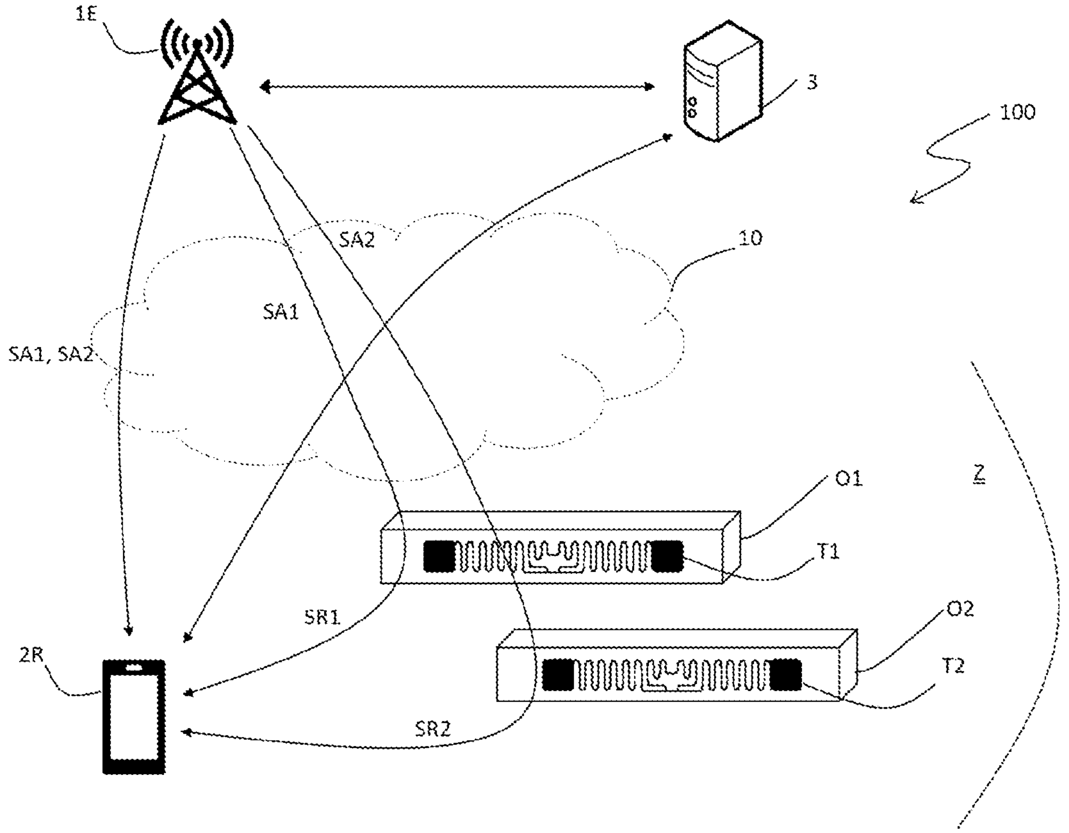
FIG. 1*a* is a diagram representing a monitoring system according to a first embodiment of the invention, in which two objects are attached to a receiver device.

FIG. 1*a* represents a monitoring system 100 in accordance with a first embodiment of the invention.

In this embodiment, the system comprises an emitter device 1E configured to emit a radiofrequency signal, called "ambient signal". In one embodiment, the emitter device 1E is a piece of network equipment, such as a base station allowing communication between a terminal 2R and a mobile telephone network 10, such as 4G or 5G networks. In other words, the radiofrequency signal or ambient signal is a telephony signal, for example 4G or 5G. The base station (or emitter device) 1E is configured to emit signals to the terminal 2R and to receive signals originating from the terminal 2R.

It will be noted that the radiofrequency signal can be different, for example a 4G or 5G mobile telephony signal, a WiFi or Bluetooth signal, or other type of signal.

Thus, according to other embodiments, the emitter device 1E can be different. As a nonlimiting example, it can be a residential gateway intended to link an access network to a packet switching network, such as the Internet. The gateway can communicate with the terminal according to wireless communication standards such as WiFi, Bluetooth or other such standards.

The terminal 2R can be a mobile telephony terminal of "Smartphone" type, a tablet, a personal computer or any other communicating object. The terminal 2R constitutes a receiver device 2R configured to receive ambient signals. The terminal 2R can be mobile or fixed. The terminal 2R can be situated in any environment, partitioned or in the open air.

It will be noted that the emitter device 1E and the receiver device 2R can take different forms. Indeed, the base station and the terminal are given as a nonlimiting example.

In the embodiment described, the base station 1E emits an ambient signal which can be a communication or signaling signal.

It will be noted that in the description of this embodiment, the emitter device and the base station are equivalent and bear one and the same reference 1E. Likewise, the receiver device and the terminal are equivalent in this embodiment and bear one and the same reference 1R.

In the embodiment of FIG. 1*a*, two objects O1, O2 are present in proximity to the receiver device. These objects O1, O2 are associated with the receiver device 2R, that is to say that they must remain in proximity to the receiver device 2R, or, in other words, that they must remain within a geographic zone Z corresponding to a geographic zone surrounding the receiver device or terminal 2R.

Each object O1, O2 comprises a backscattering tag T1, T2 configured to backscatter ambient signals emitted by the emitter device 1E (here the base station 1E) to the receiver device 2R (here the terminal 2R).

Obviously, the number of objects bearing backscattering tags T1, T2 can be different. Furthermore, other terminals could be present in the geographic zone Z and implement the invention.

The geographic zone Z corresponds to a geographic zone in which the terminal 2R is located, or a geographic zone around the terminal 2R in which the terminal 2R can detect the backscattering tags T1, T2.

As will be described hereinbelow, a backscattering tag is considered to be detected by the receiver device 2R when it receives an ambient signal backscattered by the backscattering tag, with a predefined strength. In other words, it is considered that a backscattered ambient signal SR1, SR2 backscattered by a backscattering tag T1, T2 is received (and consequently the backscattering tag T1, T2 is detected) when the strength of the backscattered ambient signal SR1, SR2 when received at the receiver device 2R is equal to or greater than a detection threshold value. Below this detection threshold value, it is considered that the backscattered ambient signal SR1, SR2 is not received by the receiver device 2R, and that, consequently, the backscattering tag T1, T2 is not detected.

Thus, the geographic zone Z around the terminal 2R corresponds to a geographic zone in which the strength of the backscattered ambient signals SR1, SR2 received has a value equal to or greater than the predefined value.

It will be noted that, for a type of backscattering tags and a reception module in the receiver device, the geographic zone Z is limited spatially by this detection threshold value.

The monitoring system 100 is configured to verify whether the objects O1, O2 are present in the geographic zone Z around the receiver device 2R, or whether they are at a distance from the receiver device or terminal 2R, or, in other words, if they are located outside of the geographic zone Z. The method for monitoring these objects will be described later with reference to FIG. 3.

It is considered that an object present in the geographic zone Z around the terminal 2R is attached to the terminal 2R and that an object which is not present in the geographic zone Z around the terminal 2R is detached from the terminal 2R. In other words, an object O1, O2 detected by the terminal 2R is attached to the terminal 2R, and an object which is not detected by the terminal is detached from the terminal 2R.

The monitoring system 100 is configured to determine, or detect, among the objects associated with a terminal 2R, the objects which are attached and the objects which are detached.

The emitter device 1E and the receiver device 2R are configured to communicate with a monitoring server 3 via the communication network 10. This monitoring server 3 can be a processing unit centrally managing the monitoring of objects.

Figure 1B:
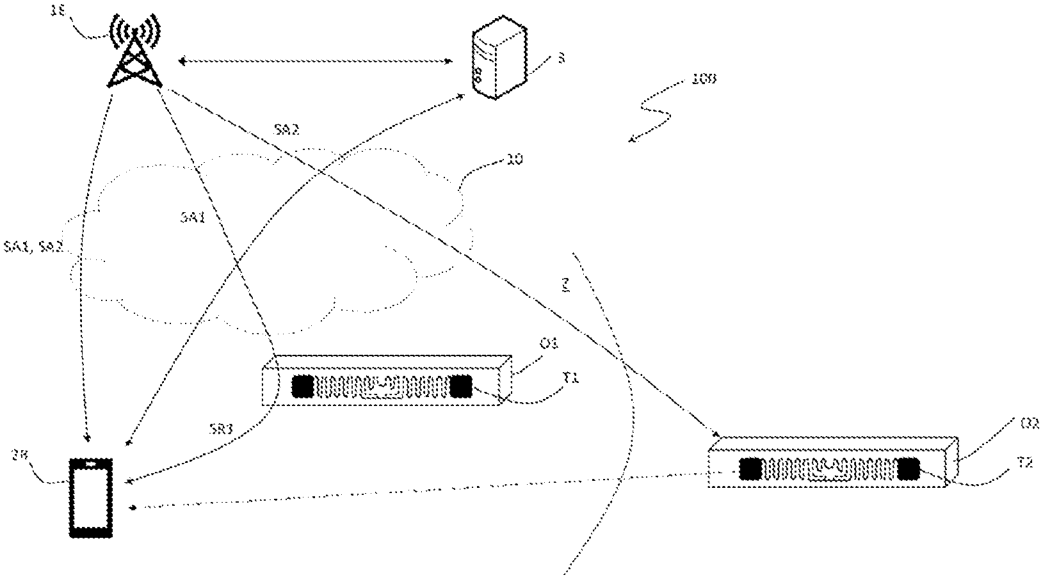
FIG. 1*b* is a diagram representing a monitoring system according to the first embodiment of the invention, in which an object is detached from a receiver device.

FIG. 1*b* represents the monitoring system 100 in accordance with the first embodiment of the invention (represented in FIG. 1*a*) in which one of the objects O1, O2 associated with the terminal 2R (the object referenced O2) is at a distance from the terminal 2R, or, in other words, has left the geographic zone Z around the terminal 2R (or detection zone of the terminal 2R).

By virtue of the monitoring method, the object O2 detached from the terminal 2R is identified, in order, for example, to be able to alert the user to the detachment thereof.

Figure 3:
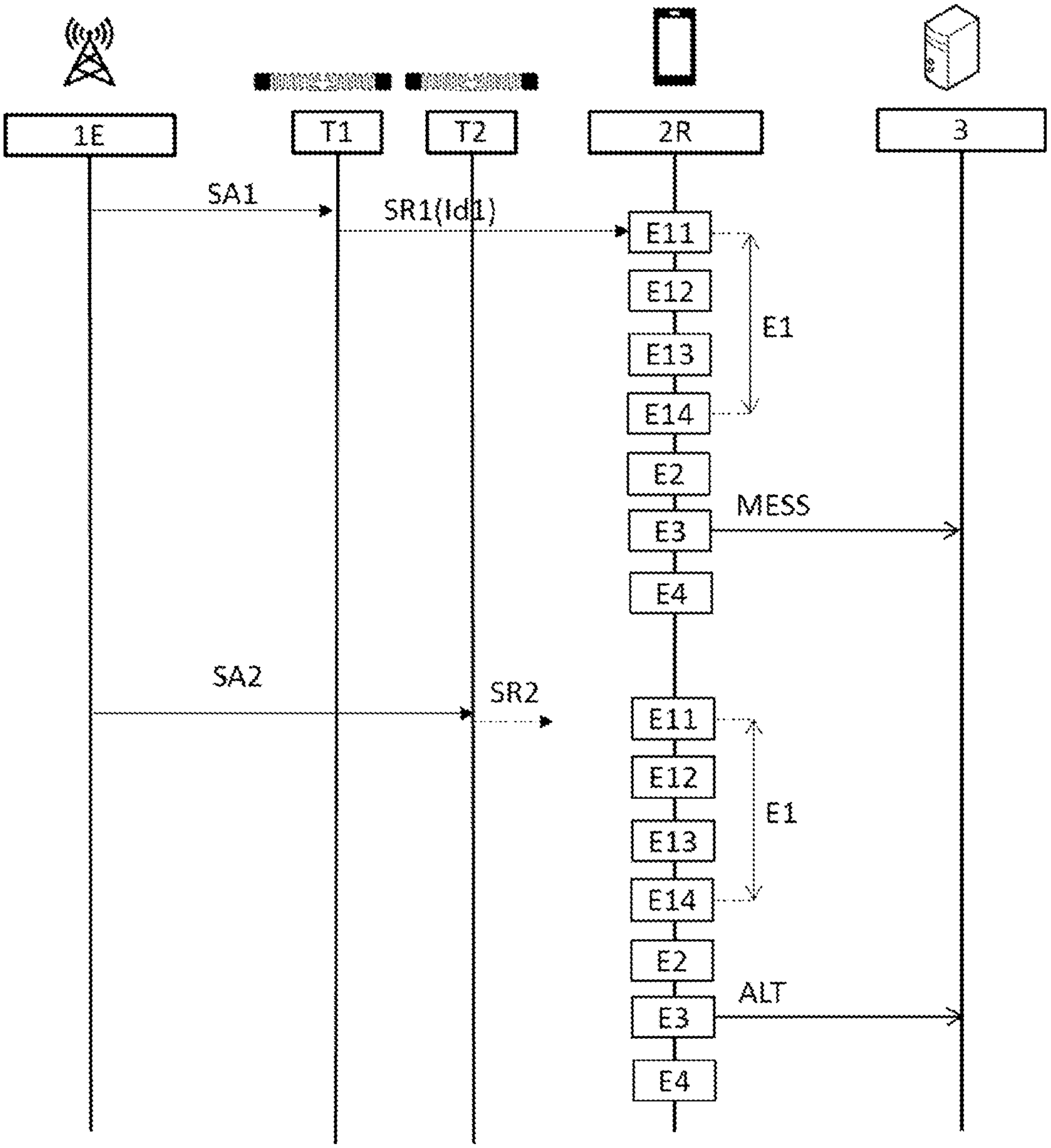
FIG. 3 illustrates steps of a monitoring method in accordance with an embodiment of the invention in the form of an exchange between the entities of FIGS. 1*a* and 1*b;*

FIG. 3 illustrates steps of the monitoring method according to a first embodiment of the invention, in the form of an exchange between the entities described with reference to FIGS. 1*a* and 1*b*. In this embodiment, the monitoring method uses the downlink communications between the base station (emitter device) 1E and the terminal (receiver device) 2R.

According to one embodiment, the steps of the monitoring method are implemented by the receiver device or terminal 2R.

As described previously, the emitter device or base station 1E is configured to emit ambient signals SA1, SA2. Each backscattering tag T1, T2 is configured to re-emit the ambient signals SA1, SA2 to the receiver device or terminal 2R. These re-emitted ambient signals SA1, SA2 are called backscattered signals SR1, SR2.

In FIG. 3, two ambient signals SA1, SA2 and two backscattered signals SR1, SR2 are represented. A first tag T1 re-emits a first ambient signal S1, that is to say re-emits a first backscattered signal SR1, and a second tag T2 re-emits a second ambient signal S2, that is to say backscatters a second backscattered signal SR2. These two ambient signals SA1, SA2 are, for example, emitted at different instants.

Obviously, the two tags T1, T2 can re-emit one and the same ambient signal SA1, SA2.

The receiver device or terminal 2R is configured to receive the backscattered signals SR1, SR2 originating from backscattering tags present in the geographic zone Z around the terminal 2R.

For the description of an embodiment of the monitoring method, it is considered that the terminal 2R receives the first backscattered signal SR1 originating from the first object O1, in particular from the first tag T1, and does not receive the second backscattered signal SR2 originating from the second object O2 (situation represented in FIG. 1*b*).

Obviously, the implementation of the method is similar in other situations, such as that represented in FIG. 1*a*.

The first backscattered signal SR1 comprises a message, this message comprising an identification datum Id1 relating to the first object O1.

According to embodiments, the identification datum Id1 relating to the first object O1 can be an identification datum uniquely identifying the object, or a part of the object O1.

As an example, the identification datum corresponds to an alphanumeric character string.

The monitoring method comprises the verification E1 of a detection of a tag T1, T2 backscattering ambient signals associated with the objects that are associated with the terminal 2R. In one embodiment, the terminal 2R comprises a list of associated objects O1, O2 to be monitored. This list of objects is, for example, stored in a memory of the terminal 2R. In the example described, the list of objects contains two objects O1, O2. When the monitoring method is implemented, the terminal 2R verifies E1 if tags T1, T2 backscattering ambient signals are detected. For that, according to one embodiment, the terminal verifies E11 if a backscattered signal originating from the object O1, O2 is received. The backscattered signal SR1, SR2 corresponds to an ambient signal SA1, SA2 and comprises a message comprising an identification datum Id1, Id2 relating to said object O1, O2.

If, upon the verification E11 of the reception of a signal, a backscattered signal SR1, SR2 is received, the message comprising the identification datum relating to the object O1, O2 bearing the backscattering tag is obtained E12. Next, the demodulation bit error ratio of the message obtained is determined E13.

Whether or not a backscattering tag T1, T2 is detected is determined E14 as a function of the value of the bit error ratio determined E13. According to one embodiment, if the quantity of the bit error ratio is greater than or equal to a predefined bit error ratio, the backscattering tag is determined as being detected. If, however, the quantity of the bit error ratio is lower than the predefined bit error ratio, the tag is determined as being not detected.

As a nonlimiting example, the predefined bit error ratio has a value of 10%. Obviously, it could have different values. It will be noted that the greater or lesser extent of the geographic zone Z is a function of the predefined bit error ratio value. Thus, by modifying this value of the bit error ratio (corresponding to a threshold value), the spatial limit of the geographic zone Z could be modified.

In other embodiments, parameters other than the bit error ratio of the message obtained in the backscattering signal received can be used to determine a backscattering tag as being detected or not detected. For example, as indicated above, the reception strength of the backscattering signal can be determined, and the backscattering tag is considered to be detected or not detected as a function of the value. According to one example, it is considered that a backscattered ambient signal SR1, SR2 backscattered by a backscattering tag T1, T2 is received (and consequently the backscattering tag T1, T2 is detected) when the strength of the backscattered ambient signal SR1, SR2 on its reception at the receiver device 2R is equal to or greater than a detection threshold value. Below the detection threshold value, it is considered that the backscattered ambient signal SR1, SR2 is not received via the receiver device 2R, and that, consequently, the backscattering tag T1, T2 is not detected. This detection threshold value is equivalent to the predefined bit error ratio value.

Based on the result of the verification E1 of the detection of a tag T1, T2 backscattering ambient signals that is associated with an object O1, O2, the object O1, O2 is identified E2 as being attached to the terminal 2R or detached from the terminal 2R. Upon identification E2, the object O1, O2 is identified as being attached to the receiver device if the tag T1, T2 backscattering ambient signals is detected (or determined E14 as being detected), and as being detached from the receiver device 2R if the tag T1, T2 backscattering ambient signals is not detected (or determined E14 as being not detected).

In the embodiment described, the first object O1 is identified as being attached to the terminal 2R, and the second object O2 as being detached from the terminal 2R.

In another embodiment, in the step of determination E14 of the detection or non-detection of the backscattering tag T1, T2, the backscattering tag is determined as being detected if the quantity of the bit error ratio is greater than or equal to a predefined bit error ratio for a first predefined detection time period. Similarly, the backscattering tag T1, T2 is determined as being not detected if the quantity of the bit error ratio is lower than the predefined bit error ratio for a second predefined detection time period.

This embodiment makes it possible to avoid successive detections of a backscattering tag as being attached and detached. This can take place, for example, when an object is located at the limit of the geographic zone Z and the terminal is mobile. One and the same object can thus be detected as attached or detached depending on the movements of the terminal 2R.

In one embodiment, the method comprises the generation E3 of an alert message ALT when an object is identified as being detached from the receiver device 2R.

In the embodiment described, an alert message ALT is generated to inform of the detachment of the second object O2 from the terminal 2R, or of the distancing of the second object O2 from the terminal 2R.

In a variant of this embodiment, the alert message ALT is generated if the object is identified as being detached from the terminal 2R for a predefined time period.

As a nonlimiting example, the predefined time period can have different values, for example a few seconds or a few minutes. This time period can be defined and modified by the use of the monitoring system.

This embodiment makes it possible to avoid the generation of an alert message before the predefined time period has elapsed, sometimes avoiding wrongly generated alert messages.

In one embodiment, the alert message ALT is rendered E4 on the terminal 2R to alert a user of the terminal 2R to the detachment of the second object O1. As an illustration, the user is alerted that the object is forgotten.

In other embodiments, the alert message ALT can be addressed to other terminals and/or to the monitoring server 3 to be rendered thereon.

When it is identified E2 that the object (for example the first object O1) is attached to the terminal 2R, an information message MESS can be generated and then reconstituted on the terminal and/or addressed to other terminals and/or to the monitoring server, to be rendered thereon. For example, by virtue of this message, a user can be informed of the objects associated with his or her terminal.

According to embodiments that are not represented, at least one out of the steps of the monitoring method described below can be implemented by the monitoring server 3.

For example, in one embodiment, at least one out of the obtaining of the message E12, the determination of the bit ratio E13, the determination E14 of the backscattering tag as being detected or not detected and the identification E2 of the object as being attached or detached can be implemented in the monitoring server 3. The result of the corresponding step can be addressed to the terminal 2R, for the next steps to be implemented by the terminal 2R.

Next, the monitoring server 3 can itself implement the generation of the alert message or of the information message as well as the rendering thereof, and/or address it to the terminal 2R (and/or to other terminals) to be rendered.

According to an embodiment not represented, the alert message ALT or the information message MESS can be addressed to the emitter device 1E.

The steps described below implemented to identify the first object O1 as being attached to the terminal 2R are implemented in a similar way to identify the second object O2 as being detached from the terminal 2R.

It will be noted that, in FIG. 3, an alert message ALT is generated to alert a user to the absence of the second object O2 from the geographic zone Z.

In one embodiment, the terminal 2R obtains the identification datum relating to the first object O1 and stores it in a list of objects itemizing the objects present in the geographic zone Z out of the objects O1, O2 that are associated with the terminal 2R. The terminal 2R can thus comprise a list of objects that are absent from the geographic zone Z out of the objects O1, O2 associated with the terminal 2R.

In an embodiment such as that represented in FIG. 3, the terminal 2R transmits E2 to the monitoring server 3, the identification datum Id1 relating to the first object O1, that is to say the identification datum Id1 contained in the first backscattered signal SR1. The monitoring server 3 can also hold a list of objects itemizing the objects present in the geographic zone Z and/or absent from the geographic zone.

Figure 2A:
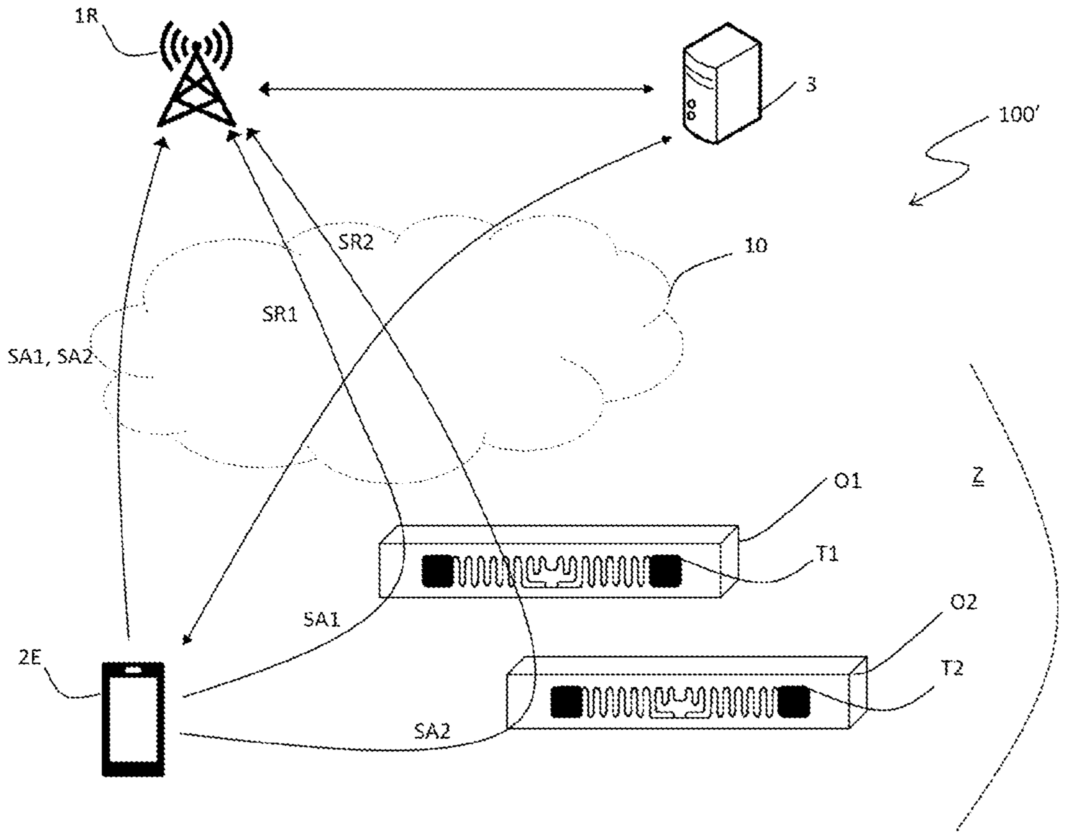
FIG. 2*a* is a diagram representing a monitoring system according to a second embodiment of the invention, in which two objects are attached to a receiver device.
Figure 2B:
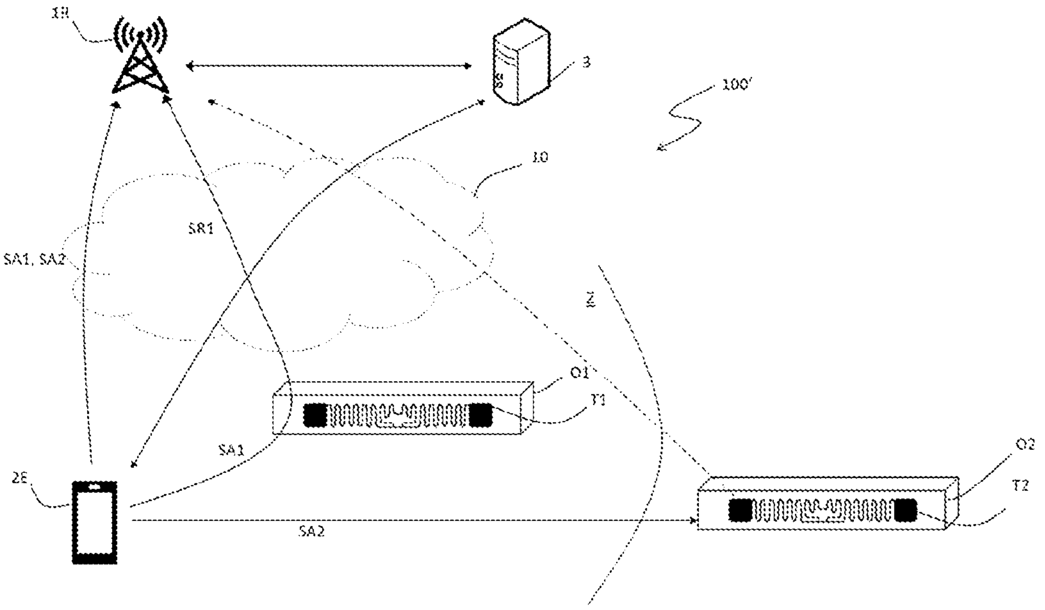
FIG. 2*b* is a diagram representing a monitoring system according to the second embodiment of the invention, in which an object is detached from a receiver device.

FIGS. 2*a* and 2*b* represent a monitoring system 100' in accordance with a second embodiment of the invention.

The equipment of the monitoring system of this embodiment is similar to the equipment of the monitoring system of FIGS. 1*a* and 1*b*.

In this embodiment, the emitter device 2E configured to emit an ambient signal is a terminal 2E and the receiver device 1R configured to detect backscattered signals is a base station 1R.

The monitoring system according to this embodiment uses the uplink communications between the terminal 2E and the base station 1R.

As for the first embodiment, the emitter device 2E is a mobile telephony terminal of "Smartphone" type, that can be a tablet, a personal computer or any other communicating object. The terminal can be mobile in a geographic zone Z or fixed.

The receiver device 1R can be another network device, such as a residential gateway intended to link an access network to a packet switching network, such as the Internet. The gateway can communicate with the terminal according to wireless communication standards such as WiFi, Bluetooth or other such standards.

As for FIGS. 1*a* and 1*b*, the emitter device 2E and the receiver device 1R can take different forms. Indeed, the base station and the terminal are given as a nonlimiting example. These devices are equivalent to those of the monitoring system of FIG. 1*a*, and will not be described in detail here.

In the embodiment described, the terminal 2E emits an ambient signal which can be a communication or signaling signal, to the base station 1R.

In the embodiment of FIG. 2*a*, two objects O1, O2 are present in the geographic zone Z. Each object O1, O2 comprises a backscattering tag T1, T2 configured to backscatter the ambient signal SA1, SA2 emitted by the emitter device 1 (here the terminal) to the receiver device 2 (here the base station).

FIG. 2*b*, in a way similar to FIG. 1*b*, represents the monitoring system 100 in accordance with the second embodiment of the invention (represented in FIG. 2*a*) in which one of the objects O1, O2 associated with the terminal 2R (the object referenced O2) is at a distance from the terminal 2R, or, in other words, it has left the geographic zone Z around the terminal 2R (or detection zone of the terminal 2R).

By virtue of the monitoring method, the object O2 detached from the terminal 2R is identified, in order, for example, to be able to alert the user to its detachment.

As indicated with reference to FIG. 1*a*, the geographic zone Z corresponds to the geographic zone in which the terminal 2E is located, or, in other words, the zone surrounding the terminal 2E.

As mentioned with reference to FIGS. 1*a* and 1*b*, the number of objects bearing backscattering tags T1, T2 can be different. Furthermore, other terminals could be present in the geographic zone Z and implement the invention.

The objects O1, O2 are similar to those described with reference to FIGS. 1*a* and 1*b*.

Figure 4:
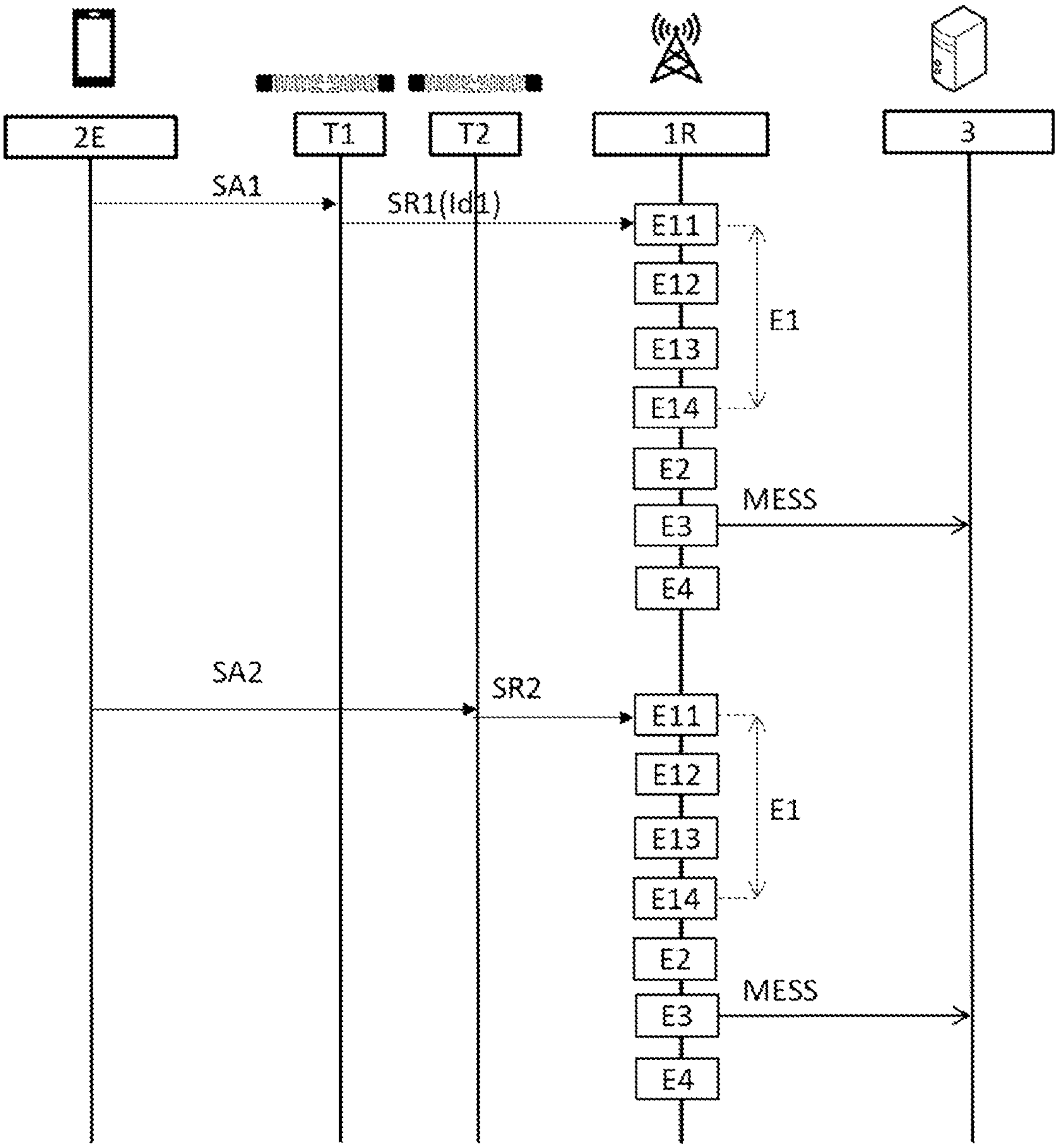
FIG. 4 illustrates steps of a monitoring method in accordance with an embodiment of the invention in the form of an exchange between the entities of FIGS. 2*a* and 2*b;*

FIG. 4 illustrates steps of the monitoring method according to a second embodiment of the invention, in the form of an exchange between the entities described with reference to FIGS. 2*a* and 2*b*. In this embodiment, the monitoring method uses the uplink communications between the terminal (emitter device) 2E and the base station (receiver device) 1R.

In this embodiment, the monitoring method is implemented by the base station 1E.

In this embodiment, it is considered that two objects O1, O2 are associated with the emitter device or terminal 2E and that the two objects O1, O2 are present in the geographic zone Z or are attached to the emitter device or terminal 2E.

In this embodiment, two backscattered signals SR1, SR2 are received by the base station 1R and the two respective backscattering tags T1, T2 are detected. The verification of the detection of a backscattering tag is implemented in a way similar to the embodiment described below with reference to FIG. 3 and will not be described again here.

In this embodiment, the two objects O1, O2 are identified as being attached to the terminal 2E.

In one embodiment, an information message MESS can be generated and addressed to the terminal 2E and to the monitoring server 3, to inform of the attachment of the objects O1, O2 to the terminal 2E or, in other words, of the presence of the objects O1, O2 in the geographic zone Z.

Figure 5A:
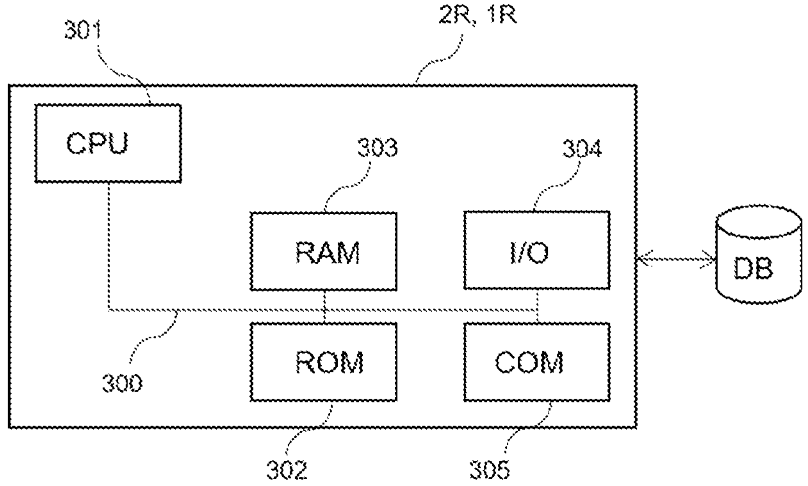
FIG. 5*a* illustrates a hardware architecture that can implement the monitoring method in accordance with the invention.

FIG. 5*a* schematically illustrates a hardware architecture of a receiver device that can implement the monitoring method in accordance with the invention. According to embodiments, the receiver device 2 can be a terminal (FIGS. 1*a* and 1*b*) or a base station (FIGS. 2*a* and 2*b*) or other network equipment.

The receiver device 2R, 1R comprises a communication bus 200 to which are linked:

- a processing unit 201, called CPU (for "Central Processing Unit") and that can comprise one or more processors;
- a non-volatile memory 202, for example ROM (for "Read Only Memory"), EEPROM (for "Electrically Erasable Read Only Memory") or a Flash memory;
- a random access memory 203 or RAM ("Random Access Memory");
- an input/output interface 204, called I/O (for "Input/Output") in the figure, for example keys or buttons, a screen, a keyboard, a mouse or another pointing device such as a touchscreen or a remote control allowing a user to interact with the receiver device 2R, 1R via a graphical interface or a human-machine interface; and
- communication interfaces 205, called COM in the figure, suitable for exchanging data for example with the emitter device, with objects O1, O2 bearing backscattering tags T1, T2 or with a monitoring server via a communication network 10.

The random access memory 203 comprises registers suitable for storing variables and parameters created and modified during the execution of a computer program comprising instructions for the implementation of the monitoring method according to the invention. The instruction codes of the program stored in non-volatile memory 202 are loaded into RAM memory 203 in order to be executed by the processor unit CPU 201.

The non-volatile memory 202 is, for example, a rewritable memory of EEPROM type or a Flash memory that can constitute a medium in the sense of the invention, that is to say that can comprise a computer program comprising instructions for the implementation of the monitoring method according to the invention. The rewritable memory can comprise lists itemizing the objects associated with a terminal, or, in other words, the objects that have to be present in a geographic zone Z around the terminal, and/or lists of identification data of the objects associated with the terminal, can be used for the implementation of the invention. Several lists of identification data can be stored. According to embodiments, a list can be a list of identification data relating to objects associated with the terminal and whose presence in the geographic zone is desirable, a list of identification data relating to objects absent from the geographic zone or a list of objects detached from the terminal, or a list of identification data relating to objects present in the geographic zone or a list of objects attached to the terminal.

Figure 5B:
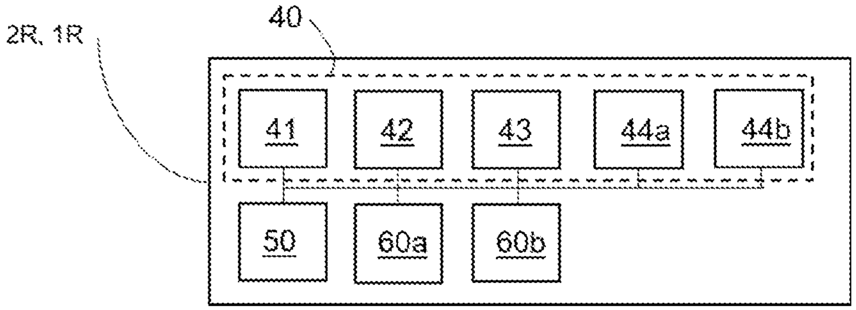
FIG. 5*b* is a functional representation of a reception device in accordance with an embodiment of the invention.

Through its instructions, this program defines functional modules of the receiver device 2R, 1R which are implemented and/or control the hardware elements described previously. FIG. 5*b* is a functional representation of a receiver device 2R, 1R in accordance with an embodiment.

These modules notably comprise:

- a verification module 40 configured to verify the detection of a tag backscattering ambient signals that is associated with said object, and
- an identification module 50 for identifying the object as being attached to the receiver device if said tag backscattering ambient signals is detected, and as being detached from the receiver if said tag backscattering ambient signals is not detected.

According to embodiments, the detection verification module 40 comprises:

- a verification module 41 configured to verify a reception E11 of a backscattered signal SR1, SR2 originating from the object, the backscattered signal corresponding to an ambient signal and comprising a message comprising an identification datum relating to said object,
- an obtaining module 42 configured to obtain E12 the message comprising the identification datum relating to said object,
- a determination module 43 configured to determine E13 the demodulation bit error ratio of said message obtained,
- a determination module 44*a* configured to determine E14 the detection or the non-detection of said backscattering tag as a function of the value of the determined bit error ratio, said backscattering tag being determined E14 as being detected if the quantity of the bit error ratio is greater than or equal to a predefined bit error ratio, and as being not detected if the quantity of the bit error ratio is lower than the predefined bit error ratio, and/or
- a determination module 44*b* configured to determine the detection or the non-detection of said backscattering tag as a function of the value of the determined bit error ratio, said backscattering tag being determined E14 as being detected if the quantity of said bit error ratio is greater than or equal to a predefined bit error ratio for a first predefined detection time period, and as being not detected if the quantity of said bit error ratio is lower than said predefined bit error ratio for a second predefined detection time period.

According to embodiments, the receiver device 2R, 1R further comprises:

a generation module 60*a* configured to generate an alert message ALT if the object is identified as being detached from said receiver device, and/or a generation module 60*b* being configured to generate an alert message ALT if said object is identified as being detached from said receiver device for a predefined time period.

The abovementioned modules and means are driven by the processor of the processing unit 301. They can take the form of a program that can be run by a processor, or a hardware form, such as a custom integrated circuit (known as ASIC, for "Application-Specific Integrated Circuit"), a system on chip (known as SoC, for "System On Chip"), or an electronic component of programmable logic circuit type, such as a component of FPGA (for "Field-Programmable Gate Array") type.

The emitter device 1E, 2E also comprises a communication bus to which are linked a processing unit or microprocessor, a non-volatile memory, a random-access memory or RAM, and a communication interface suitable in particular for exchanging data with the receiver device.

Thus, by virtue of the invention, the detachment of an object associated with a user terminal (for example because of a theft or being forgotten) and which ought to be attached to the user terminal, is detected, without in any way deploying costly monitoring systems and consuming significant quantities of energy. Indeed, the system in accordance with the invention using the backscattering of ambient signals does not consume large quantities of energy. Furthermore, the monitoring system in accordance with the invention uses equipment already present in the networks and requires only backscattering tags as additional equipment. Since these backscattering tags are not costly, the implementation of the monitoring system in accordance with the invention does not generate significant cost.

Although the present disclosure has been described with reference to one or more examples, workers skilled in the art will recognize that changes may be made in form and detail without departing from the scope of the disclosure and/or the appended claims.

The invention claimed is:

1. A monitoring method for monitoring at least one object associated with a receiver device, said monitoring method being implemented by said receiver device and comprising:

verifying a detection of a tag that backscatters ambient signals and that is associated with said at least one object, said verifying the detection comprising:

verifying a reception of a backscattered signal originating from said at least one object, the backscattered signal corresponding to an ambient signal and comprising a message, said message comprising an identification datum relating to said at least one object;

obtaining said message comprising the identification datum relating to said at least one object;

determining a demodulation bit error ratio of said obtained message; and determining a detection or a non-detection of said tag as a function of a value of the determined demodulation bit error ratio, the detection of said tag being determined when the value of said determined demodulation bit error ratio is greater than or equal to a first bit error ratio for a first detection time period, and the non-detection of said tag being determined when the value of said determined demodulation bit error ratio is lower than said first bit error ratio for a second detection time period;

identifying said at least one object as being attached to the receiver device when the detection of said tag is determined; and identifying said at least one object as being detached from the receiver device when the non-detection of said tag is determined.

2. The monitoring method as claimed in claim 1, comprising generating an alert message in response to said at least one object being identified as being detached from said receiver device.

3. The monitoring method as claimed in claim 1, comprising generating an alert message in response to said at least one object being identified as being detached from said receiver device for a first time period.

4. A receiver device having at least one object associated with the receiver device, said receiver device comprising:

at least one processor;

at least one non-transitory computer readable medium comprising instructions stored thereon which when executed by the at least one processor configure the receiver device to:

verify detection of a tag that backscatters ambient signals and that is associated with said at least one object, by:

verifying a reception of a backscattered signal originating from said at least one object, the backscattered signal corresponding to an ambient signal and comprising a message, said message comprising an identification datum relating to said at least one object;

obtaining said message comprising the identification datum relating to said at least one object;

determining a demodulation bit error ratio of said obtained message; and determining a detection or a non-detection of said tag as a function of a value of the determined demodulation bit error ratio, the detection of said tag being determined when the value of said determined demodulation bit error ratio is greater than or equal to a first bit error ratio for a first detection time period, and the non-detection of said tag being determined when the value of said determined demodulation bit error ratio is lower than said first bit error ratio for a second detection time period;

identify said at least one object as being attached to the receiver device when the detection of said tag is determined; and identify said at least one object as being detached from the receiver device when the non-detection of said tag is determined.

5. A system for monitoring the at least one object comprising the tag which backscatters ambient signals, said monitoring system comprising:

an emitter device configured to emit the ambient signals, and the receiver device as claimed in claim 4.

6. The receiver device as claimed in claim 4, said receiver device is configured to generate an alert message in response to said at least one object being identified as being detached from said receiver device.

7. The receiver device as claimed in claim 4, said receiver device is configured to generate an alert message in response to said at least one object being identified as being detached from said receiver device for a first time period.

8. The receiver device as claimed in claim 4, said verify the detection of the tag comprising determining detection or non-detection of said tag as a function of a value of the determined demodulation bit error ratio, the detection of said tag being determined when the value of said determined demodulation bit error ratio is greater than or equal to a first bit error ratio, and the non-detection of said tag being determined when the value of said determined demodulation bit error ratio is lower than said first bit error ratio.

9. The receiver device as claimed in claim 4, said verify the detection of the tag further comprising determining the detection or of the non-detection of said tag as a function of a value of the determined demodulation bit error ratio, the detection of said tag being determined when the value of said determined demodulation bit error ratio is greater than or equal to a second bit error ratio for a first detection time period, and the non-detection of said tag being determined when the value of said determined demodulation bit error ratio is lower than said bit second error ratio for a second detection time period.

10. The monitoring method as claimed in claim 1, said verifying the detection of the tag comprising determining detection or non-detection of said tag as a function of a value of the determined demodulation bit error ratio, the detection of said tag being determined when the value of said determined demodulation bit error ratio is greater than or equal to a first bit error ratio, and the non-detection of said tag being determined when the value of said determined demodulation bit error ratio is lower than said first bit error ratio.

11. The monitoring method as claimed in claim 1, said verifying the detection of the tag further comprising determining the detection or of the non-detection of said tag as a function of a value of the determined demodulation bit error ratio, the detection of said tag being determined when the value of said determined demodulation bit error ratio is greater than or equal to a second bit error ratio for a first detection time period, and the non-detection of said tag being determined when the value of said determined demodulation bit error ratio is lower than said bit second error ratio for a second detection time period.

* * * * *